United States Patent [19]
Gold

[11] Patent Number: 5,151,328
[45] Date of Patent: Sep. 29, 1992

[54] MOISTURE-ACTIVATED ADHESIVE-BACKED TAPE

[76] Inventor: Peter N. Gold, 465 N. Wood Rd., Rockville Centre, N.Y. 11570

[21] Appl. No.: 755,870

[22] Filed: Sep. 6, 1991

[51] Int. Cl.$^5$ .......................... B32B 7/12; B32B 7/14; B05D 1/18
[52] U.S. Cl. .................................. 428/351; 428/350; 428/343; 428/194; 428/192; 428/906; 427/208.4
[58] Field of Search .............. 428/351, 350, 343, 194, 428/192, 906; 206/411; 427/207.1, 208.4

[56] References Cited
U.S. PATENT DOCUMENTS

| | | |
|---|---|---|
| 2,294,347 | 8/1942 | Bauer et al. ..................... 428/343 X |
| 2,895,865 | 7/1959 | Humphner ..................... 428/350 X |
| 3,138,476 | 6/1964 | Phipps ........................... 428/343 X |
| 4,735,838 | 4/1988 | Roberts et al. ................ 428/351 X |
| 4,775,567 | 10/1988 | Harkness ....................... 428/351 X |

*Primary Examiner*—George F. Lesmes
*Assistant Examiner*—D. R. Zirker
*Attorney, Agent, or Firm*—Galgano & Belkin

[57] ABSTRACT

A moisture-activated adhesive-backed tape with part of the tape roll dipped into motor oil. The motor oil provides flexibility and waterproofing to the edges of the roll. The oil also creates a vapor barrier which prevents humidity from activating the adhesive. Also, a method for saturating the tape and placing it on a package to be bound is described.

2 Claims, 1 Drawing Sheet

MOISTURE-ACTIVATED ADHESIVE-BACKED TAPE

BACKGROUND OF THE INVENTION

1. Field of the Invention

The present invention relates to improvements in the storage, application and weatherproofing of moisture-activated adhesive-backed packaging tape. More particularly, it relates to a method and device which makes use of moisture-activated adhesive-backed tape simpler and more effective, especially in the sealing of corrugated paperboard cartons.

2. The Prior Art

Moisture-activated adhesive-backed tape used as packaging tape typically comes in 600-foot rolls, with ten rolls per carton. When storing these rolls, high humidity can cause loss of adhesion. The humidity can also activate the tape, causing the entire roll to stick to itself and thus be unusable.

Another problem associated with packaging tape is its failure to adhere entirely to the corrugated cardboard surface. Frequently, the edges of the tape, although properly moistened, do not initially adhere to the package, and pressure must be applied by the individual over the length of the tape. As can be appreciated, if many packages are to be taped, it can be very time-consuming for the individual to run his hand over the length of the tape several times until it has adhered along its edges. This problem is of course amplified if the adhesive backing is subjected to high humidity before use.

SUMMARY OF THE INVENTION

It is therefore an object of the present invention to eliminate the aforementioned drawbacks of the prior art and to provide a moisture-activated adhesive-backed tape which not affected by high humidity and can be inexpensively produced.

It is a further object of the present invention to provide such a tape which has pliable edges.

It is yet a further object of the invention to provide a tape which adheres to the package when first applied.

Even other related objects are attained according to the invention by a roll of moisture-activated adhesive-backed tape which is briefly dipped in a tray of oil and then returned to storage. The roll can be dipped in oil so that one edge is moistened and then flipped and dipped again to moisten the other edge. It is also possible to dip the entire roll into the oil. The oil can also be applied by rolling it onto the tape or spraying it onto the tape.

The oil-soaked tape has a drastically improved shelf life, since the oiled edges serve as a vapor barrier, preventing humidity from affecting the center section of the tape. Furthermore, the oil does not affect the adhesive backing of the tape, since the adhesive repels the oil. Therefore, the oil is only absorbed by the paper portion of the tape. The oil-soaked tape has the further advantage that its moistened edges have increased flexibility and adhere evenly to a package surface when first applied. In addition, the portion of the tape which is saturated with oil is now waterproofed.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
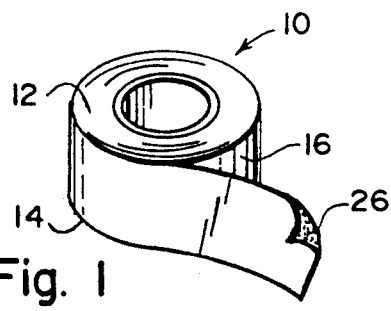
FIG. 1 is a perspective view of a roll of moisture-activated adhesive-backed tape according to the prior art.

Turning now in detail to the drawings, and in particular, FIG. 1, there is illustrated a roll of moisture-activated adhesive-backed tape 10 according to the prior art. Tape 10 has an edge 12 and 14 and a center section 16.

Figure 2:
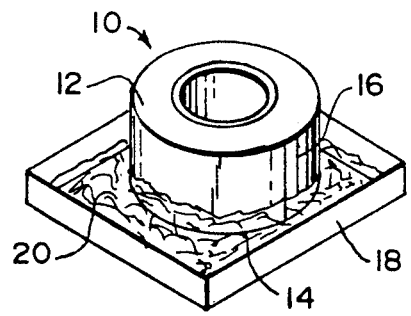
FIG. 2 is a perspective view of a roll of tape being treated according to the invention.
Figure 3:
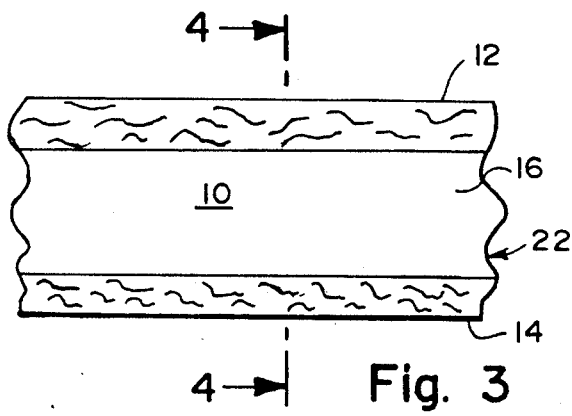
FIG. 3 is a plan view of a section of tape.

FIG. 2 shows tape 10 being treated according to the present invention. A tray 18 is filled with a quantity of motor oil 20. Tape 10 is placed into tray 18 so that edge 14 comes into contact with motor oil 20. Thereafter, tape 10 is removed from tray 18 and turned upside down and redipped so that edge 12 also is placed into contact with motor oil 20. As can be seen in FIG. 3, a strip of tape 22 removed from roll 10 has an unaffected center section 16 but has oil saturated edges 12 and 14.

Figure 4:
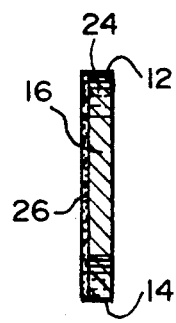
FIG. 4 is a cross-sectional view of the tape, taken along line 4—4 from FIG. 3.

As seen in FIG. 4, the tape is comprised of a paper section 24 and an adhesive portion 26. Since adhesive 26 is oil-resistant, motor oil 20 only saturates paper portion 24 in the region of edges 12 and 14. Motor oil 20 can be of any type, for example, 30 weight motor oil; other suitable conventional oils could also be employed. Although FIG. 4 only shows edges 12 and 14 saturated, center section 16 can also be saturated with motor oil 20. The saturated edges 12 and 14 are more flexible than unsaturated center section 16 and thus readily conform to the package to be taped.

Figure 5:
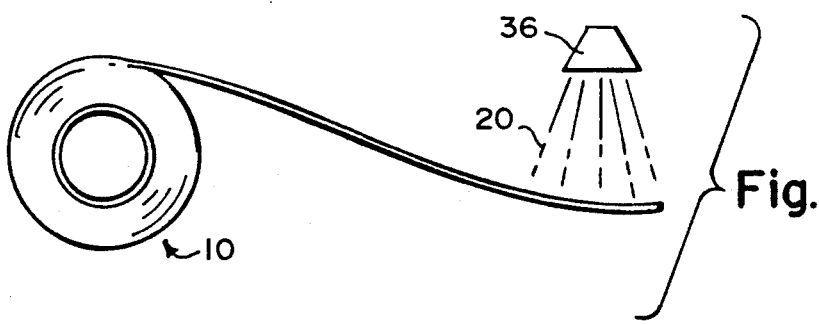
FIG. 5 is a side elevational view of an alternate embodiment for treating the tape according to the invention.
Figure 6:
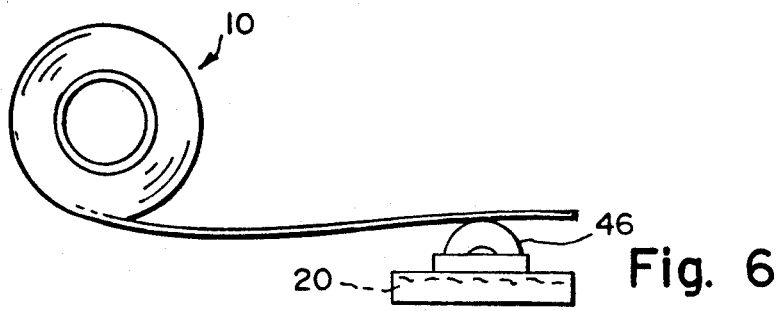
FIG. 6 is a side elevational view of yet another embodiment for treating the tape according to the invention.

Motor oil 20 can also be sprayed onto tape 10, for example, by a nozzle 36, as shown in FIG. 5. Motor oil can also be applied to tape 10 by a roller 46 as seen in FIG. 6. Roller 46 is rotatably mounted so that one portion of the roller is submersed in motor oil 20. Another section of roller 46 is placed into contact with the paper portion 24 of tape 10. As the roller rotates, oil is transferred from the container to the tape surface. As can be appreciated, the motor oil contributes flexibility and waterproofing qualities to the paper portion 24 of tape 10.

In use, the edges or the entire roll of adhesive-backed tape is saturated with motor oil. A section of tape is unrolled, moistened with water and applied to the package to be bound. It was found that the edges of oil saturated tape readily stuck to the package and it was not necessary to run a hand repeatedly over the tape. The saturated edges of the tape additionally form a waterproof seal.

While only one embodiment of the present invention has been shown and described, it is to be understood that many changes and modifications may be made thereunto without departing from the spirit and scope of the invention as defined in the appended claims.

What is claimed is:

1. A moisture-activated adhesive-backed tape comprising:
a roll of tape with a top side and underside and two edges, including a layer of moisture activated adhesive applied to the underside of the tape, and motor oil absorbed into both edges to provide flexibility, waterproofing, and a vapor barrier to prevent activation of said adhesive when the tape is rolled up.

2. A method for treating and applying moisture-activated adhesive-backed tape, comprising:
saturating both edges of rolls of moisture-activated adhesive-backed tape in motor oil.

* * * * *